(12) United States Patent
Chen

(10) Patent No.: US 7,973,778 B2
(45) Date of Patent: Jul. 5, 2011

(54) VISUAL SIMULATION OF TOUCH PRESSURE

(75) Inventor: Paul Chen, Woodinville, WA (US)

(73) Assignee: Microsoft Corporation, Redmond, WA (US)

(*) Notice: Subject to any disclaimer, the term of this patent is extended or adjusted under 35 U.S.C. 154(b) by 1114 days.

(21) Appl. No.: 11/787,372

(22) Filed: Apr. 16, 2007

(65) Prior Publication Data

US 2008/0252616 A1    Oct. 16, 2008

(51) Int. Cl.
G09G 5/00 (2006.01)
G09G 5/08 (2006.01)
G06F 3/041 (2006.01)
G06K 11/06 (2006.01)

(52) U.S. Cl. ........ 345/175; 345/156; 345/173; 345/174; 178/18.03; 178/18.05; 178/18.06; 178/18.09; 178/18.11

(58) Field of Classification Search .................. 715/700, 715/762, 763, 764, 863; 345/156, 173, 174, 345/179, 175; 178/18.03, 18.05, 18.06, 18.09, 178/18.11
See application file for complete search history.

(56) References Cited

U.S. PATENT DOCUMENTS

| | | | |
|---|---|---|---|
| 5,231,698 A * | 7/1993 | Forcier | 715/273 |
| 5,241,308 A | 8/1993 | Young | |
| 5,475,401 A * | 12/1995 | Verrier et al. | 345/179 |
| 5,610,629 A | 3/1997 | Baur | |
| 5,953,735 A * | 9/1999 | Forcier | 715/273 |
| 6,567,102 B2 | 5/2003 | Kung | |
| 6,801,191 B2 | 10/2004 | Mukai et al. | |
| 7,077,009 B2 | 7/2006 | Lokkorst et al. | |
| 7,138,984 B1 | 11/2006 | Miles | |
| 2004/0108995 A1 | 6/2004 | Hoohino et al. | |
| 2005/0057531 A1 | 3/2005 | Patino et al. | |

FOREIGN PATENT DOCUMENTS

WO    WO0118744 A1    3/2001

OTHER PUBLICATIONS

"AccuTouch Technology Specifications", http://www.elotouch.com/Technologies/AccuTouch/specifications.asp.
Crowder, R. M., "Tactile sensing", Date: 1998, http://www.soton.ac.uk/~rmc1/robotics/artactile.htm.
Lee, et al., "A Multi-Touch Three Dimensional Touch-Sensitive Tablet", Date: 1985, http://www.billbuxton.com/leebuxtonsmith.pdf.

* cited by examiner

Primary Examiner — My-Chau T Tran
(74) Attorney, Agent, or Firm — Alleman Hall McCoy Russell & Tuttle LLP

(57) ABSTRACT

The simulation of touch pressure on a touch-sensitive display is disclosed. In one disclosed embodiment, a touch pressure is simulated on a touch-sensitive display by detecting inputs corresponding to each of an untouched display and two or more measures of touch pressure, and displaying images on the display corresponding to the untouched display and each measure of touch pressure. In this manner, a user may be provided with a richer visual response to a touch-sensitive display input.

14 Claims, 4 Drawing Sheets

VISUAL SIMULATION OF TOUCH PRESSURE

BACKGROUND

Touch-sensitive displays may be used as input devices in many different computing device environments. Generally, touch-sensitive displays comprise a mechanism for detecting the touch of a user's finger or other object on a display screen, and therefore allow a user to input selections or commands to a computing device by touching the display in an appropriate location indicated by a graphical user interface (GUI). A touch-sensitive display may detect touch via any of several different mechanisms, including but not limited to optical, capacitive, and resistive mechanisms.

To provide a richer and more intuitive user experience, some GUIs may be configured to alter an image displayed on the display screen in response to a user's touch to simulate a reaction to the touch. For example, some user-selectable items may appear on a GUI as buttons. Such buttons may be displayed in either a "button up" or "button pressed down" state to visually simulate the pressing of a button by the user. However, such graphical representations of a physical response to a touch input are generally binary in nature, having only two states (pressed or unpressed) that are presented to the user.

SUMMARY

Accordingly, the simulation of touch pressure on a touch-sensitive display is described below in the Detailed Description. For example, in one disclosed embodiment, a touch pressure is simulated on a touch-sensitive display by detecting inputs corresponding to each of an untouched display and two or more measures of touch pressure, and displaying images on the display corresponding to the untouched display and each measure of touch pressure. In this manner, a user may be provided with a richer visual response to a touch-sensitive display input.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
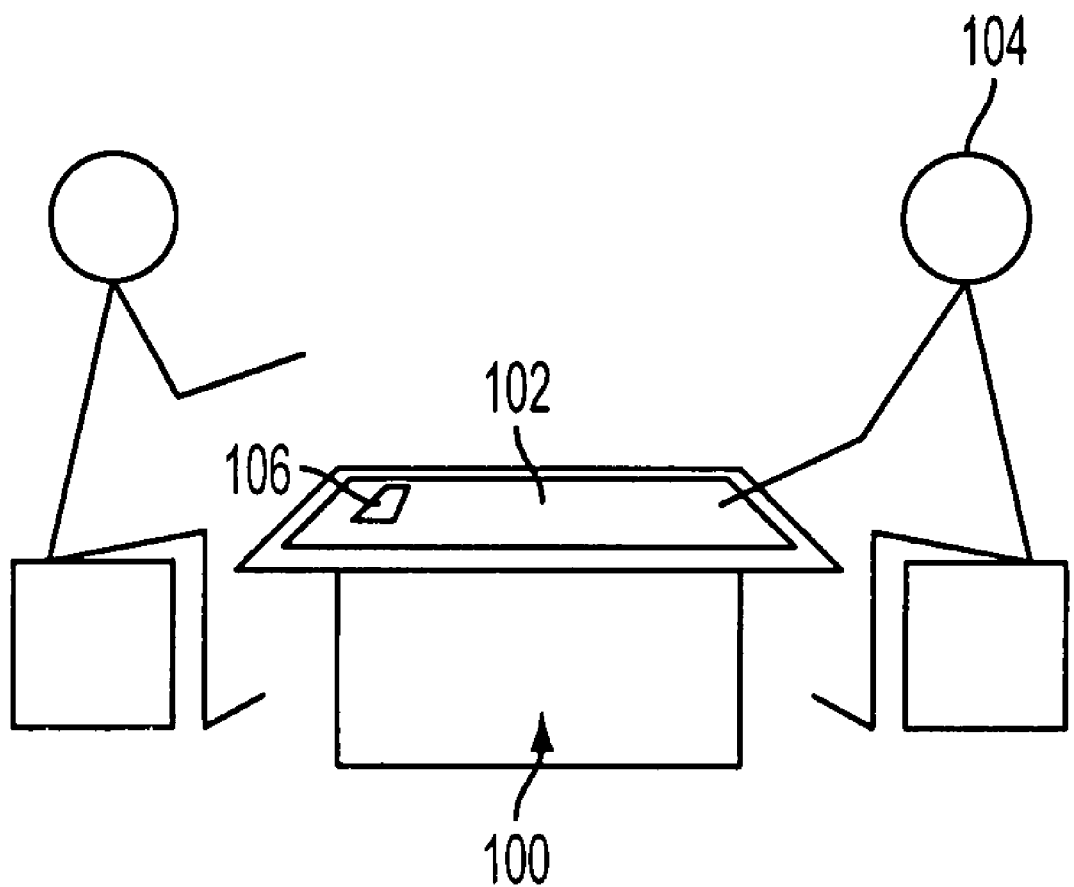
FIG. 1 shows an embodiment of a touch-sensitive display device.

FIG. 1 shows an embodiment of a touch-sensitive display device 100. Touch-sensitive display device 100 has a table-like configuration and comprises a horizontally disposed display surface 102 with a touch-sensitive input device. Touch-sensitive display device 100 may be configured to detect the touch of a person 104 and/or an object 106 other than a person, depending upon the touch-sensing mechanism employed by touch-sensitive display device 100. It will be appreciated that reference to a touch by an "object" in the discussion below refers to a touch by a person or another object interchangeably unless an embodiment is described specifically in the context of one or the other.

Further, while the embodiment of FIG. 1 comprises a display device comprising horizontally-disposed touch-sensitive surface, it will be appreciated that the embodiments discussed below and the concepts generally disclosed herein may be implemented on any suitable touch-enabled display device. Examples of such devices include, but are not limited to, computing devices such as laptop and desktop computers, hand-held devices, cellular phones, portable media players, personal digital assistants, cameras, video cameras, and other programmable consumer and commercial electronics and appliances. As used herein, the term "computing device" may include any device that electronically executes one or more programs. The embodiments described herein may be implemented on such devices, for example, via computer-executable instructions or code, such as programs, stored on a computer-readable storage medium and executed by the computing device. Generally, programs include routines, objects, components, data structures, and the like that perform particular tasks or implement particular abstract data types. The term "program" as used herein may connote a single program or multiple programs acting in concert, and may be used to denote applications, services, or any other type or class of program.

Touch-sensitive display device 100 may be used to display any suitable type of content or data, including but not limited to photographic data, video data, graphical data, documents, spreadsheets, presentations, etc. Further, as described in more detail below, touch-sensitive display device 100 may be used to simulate the appearance and properties of various materials and/or surfaces, and to simulate the response of the simulated material and/or surface to a measure of touch pressure detected by the touch-sensing mechanism or mechanisms employed.

Figure 2:
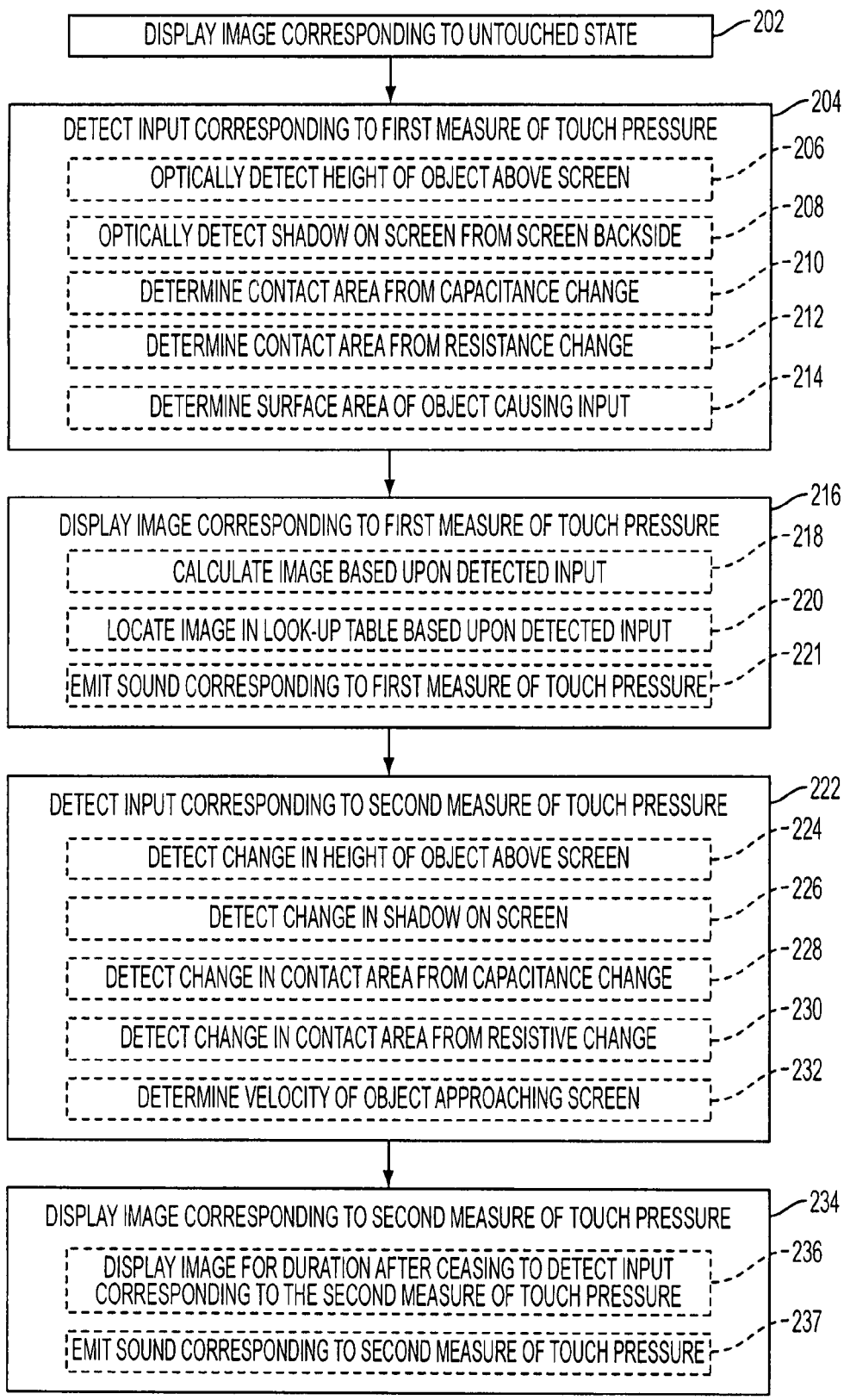
FIG. 2 shows a process flow depicting an embodiment of a method of simulating touch pressure via a touch-sensitive display.

FIG. 2 shows a process flow depicting an embodiment of a method 200 for simulating a touch pressure via a touch-sensitive display. Method 200 comprises, at 202, displaying an image in an untouched state, and then, at 204, detecting an input from a touch-sensitive input device associated with the display that corresponds to a first measure of touch pressure. Detecting the input corresponding to a first measure of touch pressure may be accomplished in any number of ways, depending upon the touch sensing mechanism employed by the touch-sensitive input device. For example, detecting the first measure of touch pressure may comprise optically detecting, at 206, a height of an object above a display screen via one or more optical detectors configured to image the front side of the display screen and a region of space adjacent to the front side of the display screen. Likewise, detecting the first measure of touch pressure may comprise optically detecting, at 208, the presence of a shadow on the display screen from an image detector configured to image a backside of the display screen. Further, detecting the first measure of touch pressure may comprise detecting, at 210, a touch via a capacitance change via a capacitive touch-screen device, and/or detecting, at 212, a touch via a resistive change via a resistive touch screen device. Also, detecting the first measure of touch pressure may further comprise determining or estimating, at 214, a surface area of the display screen that is touched from the optical, capacitive and/or resistive inputs received from the touch-sensitive input device.

Method 200 next comprises, at 216, displaying an image corresponding to the first measure of touch pressure. As opposed to the two-state systems described above in which only images corresponding to general "untouched" and "touched" states are displayed, process 216 permits the image displayed to more finely reflect the specific input or inputs detected at 204. As an example, where the touch-sensitive input device comprises one or more image capture devices configured to detect a height of an object above the display screen, the image corresponding to the first measure of touch pressure may be specifically tailored to reflect the actual height of the object above the display surface detected. Where an object is detected at a farther distance from the display screen, the image displayed on the display screen may be modified only slightly to simulate a light touch. Likewise, where an object is detected at a closer distance from the display screen, the image displayed on the display screen may be more heavily modified to simulate a stronger touch. Further, measuring the surface area of the surface of the object that is responsible for generating a touch input, as indicated at 214, may allow the image corresponding to the first measure of touch pressure to be tailored such that the response of the image to the touch corresponds to the shape and size of the "touching" surface of the object.

The image corresponding to the first measure of touch pressure may be calculated or determined in any suitable manner. For example, as indicated at 218, the image corresponding to the first measure of touch pressure may be calculated utilizing mathematical functions that apply a gradient of pressure effect to a displayed image. Alternatively, as indicated at 220, various images corresponding to different measures of touch pressure may be stored in a look-up table. In these embodiments, an input received from the touch-sensitive input device may be compared to the look-up table, and an image corresponding to that measure of touch pressure may be located in the table and displayed on the display. While both of these approaches may provide the ability to simulate multiple degrees of touch pressure, the use of mathematical functions may allow for a greater response range, a more object-specific response, and/or a finer degree of detail. Further, in some embodiments, a sound emitted by a device may change as a function of a measure of touch pressure, as indicated at 221.

The amount of variation between an appearance of the untouched image and an appearance of the image corresponding to the first measure of touch pressure may be a function of the material or surface being simulated. For example, where the surface being simulated is fabric, sand, soft clay, or other relatively soft surface, the displayed image may undergo a relatively significant change in response to a detected change in a measure of touch pressure. Examples of changes that may be made to such images in response to a touch input may include displaying a relatively deep deformation or depression in the surface. Likewise, where the surface being simulated is a relatively hard surface, the displayed image may undergo a relatively insignificant change in response to the detected measure of touch pressure.

Continuing with FIG. 2, method 200 next comprises, at 222, detecting an input corresponding to a second measure of touch pressure. The second measure of touch pressure may be either greater or lesser than the first measure of touch pressure, thereby corresponding to either an increase or decrease in the simulated pressure displayed on the display. The second measure of touch pressure may be detected in any suitable manner, depending upon the touch-sensing mechanism utilized. For example, the second measure of touch pressure may be detected by optically detecting a change in the height of the object above the screen compared to the first measure of touch pressure, as indicated at 224. Likewise, the second measure of touch pressure may be detected by optically detecting a change in the size of a shadow detected on the screen via an image capture device configured to image a backside of the display screen, as indicated at 226. In other embodiments, a change in a capacitance or resistance corresponding to a change in a pressure or an area of the touch-sensitive display contacted by an object may be detected via a suitable capacitive or resistive touch-sensitive input device, as shown at 228 and 230.

Further, in some embodiments, the second (or first) measure of touch pressure may be determined, at 232, by measuring a velocity of an object approaching the screen. In this manner, a greater velocity may be interpreted as causing the exertion of a greater simulated pressure on the displayed image, while a lesser velocity may be interpreted as causing the exertion of a lesser simulated pressure on the displayed image. This may allow a visual effect of an "impact" to be simulated for different "impact" speeds.

Continuing with FIG. 2, method 200 next includes, at 234, displaying an image corresponding to a second measure of touch pressure. As with the image corresponding to the first measure of touch pressure at 216, the image corresponding to the second measure of touch pressure may be determined mathematically, or may be determined via a look-up table. Where the image corresponding to the second measure of touch pressure takes into account the shape and size of the contacting object in simulating the touch pressure, the use of a mathematical formula to calculate the image may offer a richer, more detailed response to the measure of touch pressure than the use of images stored in a look-up table.

The image corresponding to the second measure of touch pressure may simulate the second measure of touch pressure in any suitable manner. For example, where the second measure of touch pressure corresponds to a greater touch pressure than the first measure of touch pressure, an indentation effect, lighting/shading effects, and/or other visual simulation of pressure may be increased to simulate the increase in pressure. Likewise, where the second measure of touch pressure corresponds to a lesser touch pressure than the first measure of touch pressure, an indentation, lighting/shading effect, and/or other visual simulation of pressure may be decreased to simulate the decrease in pressure. Further, the rate at which an indentation, light/shading effect, and/or other visual simulation of pressure decreased may be controlled to more realistically simulate a property of the displayed material or surface. For example, if the displayed material or surface is a pillow, a decrease in the measure of touch pressure may be simulated by a more gradual decrease in the visual effects in the displayed image, simulating a slow return to an untouched state.

Further, as indicated at 236, the image corresponding to either the first or the second measure of touch pressure may be displayed for a duration after removal of the touch pressure. Again using the example of the display of a pillow, a residual indentation may remain in the displayed image for an extended period of time after the cessation of any measure of touch pressure to simulate a property of a real pillow. Likewise, if the simulated surface is clay, a depression may remain in the displayed image indefinitely until reset by a user to simulate the moldability of clay. It will be appreciated that any suitable material and/or material property may be displayed in this manner. Further, display device 100 may be configured to simulate any number of surfaces and/or materials, and may utilize any number of general or material-specific mathematical functions to calculate the images corresponding to any suitable measure of touch pressure.

In some embodiments, other properties of a material rather than a degree/type/duration of indentation and/or lighting/shading effects may be simulated in response to different measures of touch pressure. For example, a degree, magnitude, or duration of a motion simulated on the display may be varied depending upon the magnitude of the measure of touch pressure. As a specific example, if the simulated material is water or other liquid, a magnitude of a splash and/or ripple effect may be varied depending upon the measure of touch pressure, wherein a greater measure of touch pressure and/or higher measured touch velocity may cause an increased magnitude and/or duration of simulated ripples. Likewise, an output sound may be varied in response to different measures of touch pressure, as shown at 237. For example, if a cymbal is displayed on the display, a greater measure of touch pressure and/or a higher measured touch velocity may cause a greater magnitude and/or duration of vibration of the displayed cymbal, as well as a louder initial sound. Further, referring again to the water example, a "splash" sound emitted in response to a detected measure of touch pressure may be varied depending upon the magnitude of the measure of the touch pressure.

While FIG. 2 depicts the detection of a first measure of touch pressure occurring before the detection of a second measure of touch pressure, it will be appreciated that the various processes depicted in FIG. 2 may be performed in any suitable order. For example, the input corresponding to the first measure of touch pressure may cease for a duration before the input corresponding to the measure of the second touch pressure begins, thereby having a period with no touch pressure between the two periods of touch pressure. Alternatively, the first and second touch pressures may occur back-to-back, without any intermediate period of no measure of touch pressure. Further, while FIG. 2 depicts the display of images corresponding to an untouched state and two different measures of touch pressure, it will be appreciated that the concepts disclosed in FIG. 2 may apply to any number of touch states, including but not limited to embodiments that employ equations that allow a displayed image to be continuously or finely altered in response to small changes in the measure of touch pressure received from the input device.

Method 200 may be used in a wide variety of applications. For example, method 200 may be used to provide a richer and more entertaining display background. As a specific example, a computing device may employ a desktop background depicting water, sand, clay, etc. that reacts to a user's input according to method 200. Likewise, method 200 may be used to provide a richer user experience in various games and entertainment programs. For example, an application may be configured to display a drum kit, and the visual effects displayed and the sounds emitted may be modified depending upon the measure of touch pressure received.

Method 200 may also find uses in therapeutic and training environments. For example, children with autism sometimes demonstrate an unusual sensitivity to the feel of different materials and surface textures. As a possible therapy for such children, method 200 may be used to display to an autistic child a material or surface that has caused a negative touch response in that child. Because the actual display surface has a different texture or feel than the material displayed in the image on the display, the feel of the display surface may not cause the same negative reaction caused by the feel of the actual material. However, the displayed image of the material may react to the user's touch in a manner that simulates how the actual material would react to the user's touch. Therefore, the user may develop a familiarity with some properties of the actual material via manipulating the simulated material before being re-introduced to the actual material.

Method 200 may find further use in professional training environments. For example, a display device may be configured to allow virtual dissections to be performed, thereby allowing doctors, medical students, veterinarians, veterinary students, and other health professionals to study anatomy via virtual dissections performed at a display device embodying method 200. For example, a display device may be configured to detect the proximity or touch of a practice scalpel, and tissue displayed on the display may be configured to display a reaction to the scalpel, such as to indent under light pressure and to open an incision under heavier pressure. It will be appreciated that the above-listed examples of use environments for method 200 are set forth merely for the purpose of example, and are not intended to be limiting in any manner.

Figure 3:
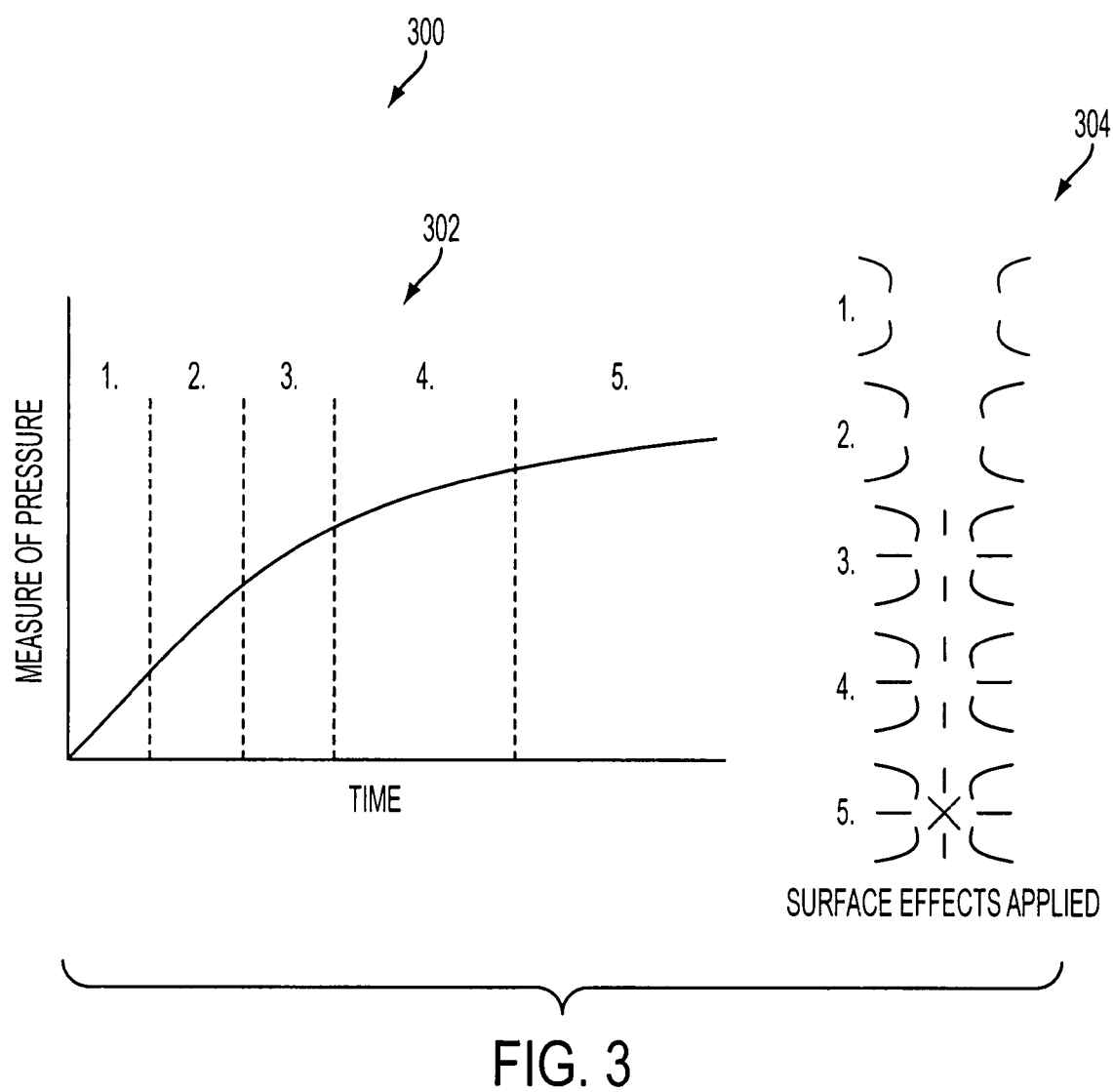
FIG. 3 shows a graphical and schematic representation of a change in a displayed image as a function of an increase in a measure of touch pressure.

FIG. 3 shows a graphical representation 302 and a schematic representation 304 of an example of changes made to an image displayed on a touch-sensitive display as an increase in touch pressure is detected over a period of time. Each numbered zone in graph 302 corresponds to the schematic representation of surface effect having the same number.

As can be seen in graph 302, the degree of effects applied to the image increases relatively proportionately with increases in touch pressure. As touch pressure initially increases at a relatively faster pace, the surface effects are also changed at a relatively faster pace. The change is relatively linear for the first portion of the detected increase in measured touch pressure, and then increases less rapidly as the measure of touch pressure continues to increase. The schematic representation of the surface effects shown at 304 represent an indentation that may be displayed around the outer perimeter of an object, such as a finger approaching or touching the display surface. As the pressure increases, the indentation simulated in the image also increases and becomes more sharply delineated. Only five separate degrees of applied effects are shown in FIG. 3 for the purpose of clarity and simplicity. However, it will be appreciated that any number of separate degrees of applied effects may be employed, and that the richest implementations may be able to detect and respond to sufficiently fine changes in the measure of touch pressure as to represent a continuous reaction to changes in the measurement of pressure.

Figure 5:
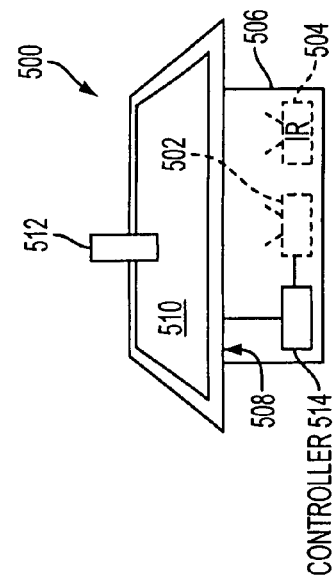
FIG. 5 shows a schematic view of another embodiment of a touch-sensing mechanism for a touch-sensitive display.
Figure 4:
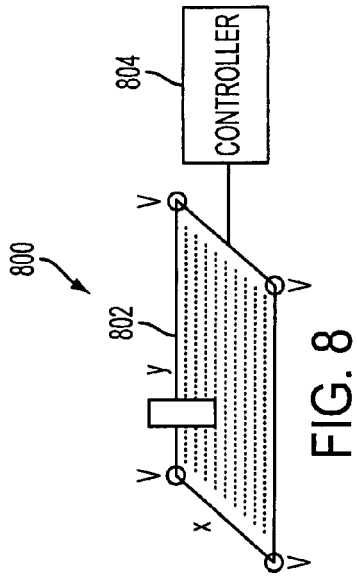
FIG. 4 shows a schematic view of an embodiment of a touch-sensing mechanism for a touch-sensitive display.

As mentioned above, various different touch-sensitive input devices may be used to detect a change in touch pressure. FIGS. 4 and 5 show schematic diagrams of two examples of optical touch-sensitive display systems. First referring to FIG. 4, touch-sensitive display system 400 comprises a display screen 402 and a plurality of cameras 404a, 404b and 404c arranged around display screen 402. Cameras 404a-c are configured to capture images of a front side 406 of display screen 402 (i.e. the side of the display screen that faces a user) and a region of space adjacent to front side 406 of display screen 402. Cameras 404a-c are further configured to provide this image data to an electronic controller 407 configured to determine a height of an object 408 above display screen 402 when the object is within the field of view of cameras 404a-c. Therefore, in this embodiment, the height of object 408 above display screen 402 may serve as the measure of touch pressure exerted by the object, wherein the measure of pressure increases as object 408 gets closer to display screen 402. Further, cameras 404a-c may also be used to determine an approximate size of the object. From this object height and object size data, a measure of touch pressure and a measure of a touch surface area may be determined and used to modify an image displayed on display screen 402.

Further, controller 407 and cameras 404a-c may be configured to capture image data at an appropriately high frame rates such that a velocity at which object 408 is moving relative to display screen 402 may be determined. In this matter, the velocity of the approaching object 408 may be used as an additional input to determine a measure of touch pressure.

FIG. 5 shows another embodiment of an optical touch-sensitive display device 500. Display device 500 comprises a camera 502 and an infrared light source 504 disposed within a body 506 of the display device. Camera 502 is configured to capture an image of a backside 508 of a display screen 510. This allows camera 502 to image objects that reflect infrared light from source 504. Display screen 510 may include a diffuser layer (not shown) to allow an image to be projected onto the screen.

Figure 6:
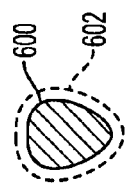
FIG. 6 shows a schematic view of a change in an image detected by the touch-sensing mechanism of FIG. 5 with an increase in touch pressure.

In the embodiment of FIG. 5, objects located on or slightly above display screen 510 may be detectable, while objects located farther from the screen will not be imaged due to the presence of the diffuser layer in display screen 510. Further, where the object 512 (such as a finger) that is used to touch display screen 510 is relatively soft or deformable, the size of the image caused by the touching object may increase with increasing touch pressure due to the deformation of the touching object on the display screen 510. This is illustrated in FIG. 6, where a light touch is indicated by solid shape 600 and a heavier touch is indicated by dashed line shape 602. In this manner, a varying measure of touch may be detected by changes in the size of the object imaged by camera 502. This data may be input to an electronic controller 514 for calculating the appropriate modifications to make to an image displayed on screen 510.

Figure 7:
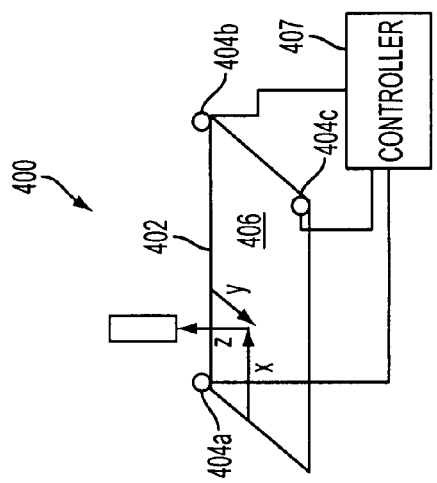
FIG. 7 shows a schematic view of another embodiment of a touch-sensing mechanism for a touch-sensitive display.
Figure 8:
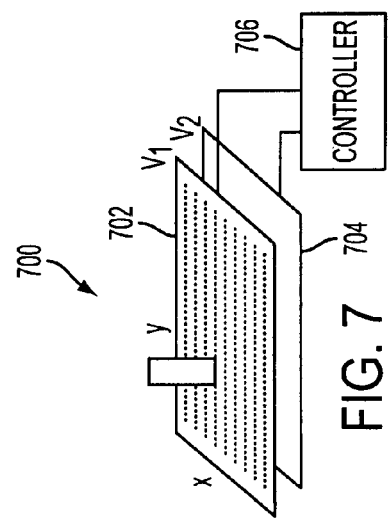
FIG. 8 shows a schematic view of another embodiment of a touch-sensing mechanism for a touch-sensitive display.

FIGS. 7 and 8 show simple schematic diagrams of other types of touch-sensitive displays that may be used to provide a measure of touch pressure. First, FIG. 7 shows a simple schematic diagram of a resistive touch-sensitive display 700. Resistive touch-sensitive display 700 comprises two layers of materials 702, 704 held in a separated arrangement by one or more spacers (not shown). Each layer of material comprises an electrically conductive coating facing the other layer, and at least one of the layers comprises a resistive coating. A voltage V1 is applied to layer 702, and a voltage V2 is applied to layer 704. When touched, layers 702 and 704 are pressed together, thereby completing a circuit between layers 702 and 704. The (x,y) touch location and a measure of pressure may be determined by a controller 706 by analyzing the properties of the signal produced by the contacted layers.

Next, FIG. 8 shows a simple schematic diagram of a capacitive touch-sensitive display 800. Capacitive touch-sensitive display comprises a capacitive layer 802 comprising a material configured to store an electric charge. When the screen is touched, some charge is transferred to the touching object as long as the object is electrically conductive. The decrease in stored charge is detected by the measurement of voltage at each corner of the screen, and the (x,y) touch location and measure of touch pressure may be determined from these voltage measurements by a controller 804.

It will be appreciated that the configurations and/or approaches described herein are exemplary in nature, and that these specific embodiments or examples are not to be considered in a limiting sense, because numerous variations are possible. Furthermore, the specific routines or methods described herein may represent one or more of any number of processing strategies such as event-driven, interrupt-driven, multi-tasking, multi-threading, and the like. As such, various acts illustrated may be performed in the sequence illustrated, in parallel, or in some cases omitted. Likewise, the order of any of the above-described processes is not necessarily required to achieve the features and/or results of the embodiments described herein, but is provided for ease of illustration and description. The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. In an apparatus comprising a display and an input device configured to detect one or more of a proximity of an object to the display and a touch of the object on the display, a method of simulating touch pressure, comprising:
   displaying on the display an image corresponding to an untouched state;
   detecting via the input device an input corresponding to a first measure of touch pressure, wherein detecting the input corresponding to the first measure of touch pressure comprises detecting the object at a farther distance from the display;
   displaying on the display an image corresponding to the first measure of touch pressure;
   detecting via the input device an input corresponding to a second measure of touch pressure, wherein detecting the input corresponding to the second measure of touch pressure comprises detecting the object at a closer distance to the display; and
   displaying on the display an image corresponding to the second measure of touch pressure.

2. The method of claim 1, wherein displaying the images corresponding to the first and second measures of touch pressure comprises calculating the images corresponding to the first and second measures of touch pressure.

3. The method of claim 1, wherein displaying the images corresponding to the first and second measures of touch pressure comprises displaying images associated in a look-up table with the first and second measures of touch pressure.

4. The method of claim 1, further comprising outputting a first sound corresponding to the first measure of touch pressure and outputting a second sound corresponding to the second measure of touch pressure.

5. The method of claim 1, further comprising detecting an input via the input device that corresponds to a measure of impact velocity, and displaying on the display an image corresponding to the measure of impact velocity.

6. The method of claim 1, wherein the image corresponding to the first measure of touch pressure is displayed for a duration after ceasing to detect the input corresponding to the second measure of touch pressure.

7. The method of claim 1, wherein the input device comprises a plurality of image capture devices, and wherein detecting the inputs corresponding to the first and second measures of touch pressure comprises determining distances of an object from the display via images of the object acquired with the plurality of image capture devices.

8. The method of claim 1, wherein the input device comprises one or more image capture devices, and wherein detecting the inputs corresponding to the first and second measures of touch pressure comprises determining a change in a size of a shadow detected on the display.

9. The method of claim 1, wherein receiving inputs corresponding to the first and second measures of touch pressure comprises receiving inputs from one or more of a capacitive touch-screen device and a resistive touch-screen device.

10. The method of claim 1, further comprising determining an area of a surface of the object with which the measure of pressure is exerted, and wherein the images corresponding to the first and second measures of touch pressure each comprise an intent effect that corresponds to a shape and/or size of the object.

11. In an apparatus comprising a display and an input device configured to detect one or more of a proximity of an object to the display and a touch of the object on the display, a method of simulating touch pressure, comprising:
displaying on the display an image corresponding to an untouched state;
optically detecting via one or more image capture devices an input corresponding to a first measure of touch pressure, wherein the input is detected by the input device comprising one or more image capture devices, wherein the input corresponding to the first measure of touch pressure corresponds to a first distance of the object from the display via images of the object acquired with the one or more image capture devices;
displaying on the display an image corresponding to the first measure of touch pressure;
optically detecting via the one or more image capture devices an input corresponding to a second measure of touch pressure, wherein the input is detected by the input device comprising one or more image capture devices, wherein the input corresponding to the second measure of touch pressure corresponds to a second distance of the object from the display via images of the object acquired with the one or more image capture devices, wherein detecting the inputs corresponding to the first and second measures of touch pressure comprises determining a change in a size of a shadow detected on the display; and
displaying on the display an image corresponding to the second measure of touch pressure.

12. The method of claim 11, wherein the first distance is a farther distance from the display, and wherein the second distance is a closer distance to the display.

13. The method of claim 12, wherein the first distance is a distance from the display, and wherein the second distance is touching the display.

14. In an apparatus comprising a display and an input device configured to detect one or more of a proximity of an object to the display and a touch of the object on the display, a method of simulating touch pressure, comprising:
displaying on the display an image corresponding to an untouched state;
optically detecting an input corresponding to a first measure of touch pressure, wherein the input is detected by the input device comprising one or more image capture devices, wherein the input corresponding to the first measure of touch pressure corresponds to a first distance of the object from the display via images of the object acquired with the one or more image capture devices;
displaying on the display an image corresponding to the first measure of touch pressure;
optically detecting an input corresponding to a second measure of touch pressure, wherein the input is detected by the input device comprising one or more image capture devices, wherein the input corresponding to the second measure of touch pressure corresponds to a second distance of the object from the display via images of the object acquired with the one or more image capture devices, wherein the first distance is a farther distance from the display and the second distance is a closer distance to the display, wherein detecting the inputs corresponding to the first and second measures of touch pressure comprises determining a change in a size of a shadow detected on the display;
displaying on the display an image corresponding to the second measure of touch pressure; and
determining an area of a surface of the object with which the measure of pressure is exerted, wherein the images corresponding to the first and second measures of touch pressure each comprise an intent effect that corresponds to a shape and/or size of the object.

* * * * *